United States Patent [19]
Toya et al.

[11] Patent Number: 6,107,411
[45] Date of Patent: Aug. 22, 2000

[54] BLOCK COPOLYMER, BLOCK COPOLYMER COMPOSITION AND HEAT SHRINKABLE FILMS MADE THEREOF

[75] Inventors: Hideki Toya; Masayoshi Nakazato; Hiroshi Suzuki, all of Ichihara, Japan

[73] Assignee: Denki Kagaku Kogyo Kabushiki Kaisha, Tokyo, Japan

[21] Appl. No.: 09/002,920

[22] Filed: Jan. 5, 1998

[30]  Foreign Application Priority Data

Jan. 7, 1997 [JP] Japan .................................. 9-000523
  Sep. 29, 1997 [JP] Japan .................................. 9-263180

[51] Int. Cl.$^7$ .................................................. C08F 297/04
[52] U.S. Cl. .............................. 525/316; 525/88; 525/89; 525/97; 525/98; 525/99
[58] Field of Search ................................ 525/316, 88, 89, 525/97, 98, 99

[56]  References Cited

U.S. PATENT DOCUMENTS

| | | |
|---|---|---|
| 4,386,125 | 5/1983 | Shiraki et al. . |
| 5,189,110 | 2/1993 | Ikematu et al. . |
| 5,319,033 | 6/1994 | Trepka et al. ............................ 525/314 |
| 5,554,697 | 9/1996 | Van Dijk et al. ........................ 525/316 |
| 5,583,182 | 12/1996 | Asahara et al. .......................... 525/314 |

FOREIGN PATENT DOCUMENTS

| | | |
|---|---|---|
| 0 740 214 | 10/1996 | European Pat. Off. . |
| WO 95/33006 | 12/1995 | WIPO . |

OTHER PUBLICATIONS

Patent Abstracts of Japan, vol. 95, No. 7, Aug. 31, 1995, JP 07 097419, Apr. 11, 1995.
Patent Abstracts of Japan, vol. 95, No. 11, Dec. 26, 1995, JP 07 216186, Aug. 15, 1995.
Patent Abstracts of Japan, vol. 97, No. 1, Jan. 31, 1997, JP 08 225712, Sep. 3, 1996.

*Primary Examiner*—James J. Seidleck
*Assistant Examiner*—Olga Asinovsky
*Attorney, Agent, or Firm*—Oblon, Spivak, McClelland, Maier & Neustadt, P.C.

[57]  ABSTRACT

A block copolymer (hereinafter referred to as the block copolymer (I)), consisting essentially of a vinyl aromatic hydrocarbon and a conjugated diene and satisfying the following conditions (1) to (5):

(1) the weight ratio of vinyl aromatic hydrocarbon units to conjugated diene units is from 60:40 to 90:10, (2) the number average molecular weight of the block copolymer is from 40,000 to 500,000, (3) the ratio of E'30/E'10, where E'30 is the storage modulus at a temperature of 30° C. and E'10 is the storage modulus at a temperature of 10° C., is from 0.75 to 1, (4) the block proportion of a vinyl aromatic hydrocarbon polymer contained in the block copolymer is from 70 to 100%, provided the block proportion=W1/W0×100, where W1 is the weight of block polymer chains of the vinyl aromatic hydrocarbon in the block copolymer, and W0 is the total weight of the vinyl aromatic hydrocarbon units in the block copolymer, and (5) chains consisting of from 1 to 3 repeating units of the vinyl aromatic hydrocarbon contained in the block copolymer, are not more than 25%, based on the above W0.

7 Claims, No Drawings

BLOCK COPOLYMER, BLOCK COPOLYMER COMPOSITION AND HEAT SHRINKABLE FILMS MADE THEREOF

The present invention relates to a block copolymer consisting essentially of a vinyl aromatic hydrocarbon and a conjugated diene, which is excellent in transparency, stiffness, impact resistance and spontaneous shrinkage resistance, a composition comprising such a block copolymer, and heat shrinkable films prepared by orienting them.

It is known that when a vinyl aromatic hydrocarbon and a conjugated diene are subjected to block copolymerization by living anion polymerization in an organic solvent using an alkyl lithium as an initiator, the structure of the copolymer can be diversified by a method of e.g. changing the weight ratio of the vinyl aromatic hydrocarbon to the conjugated diene or changing the manner of addition, whereby block copolymers having various physical properties can be obtained. In general, a block copolymer is a polymer having excellent impact resistance and transparency. If the content of the conjugated diene in the block copolymer is large, the copolymer tends to be a thermoplastic elastomer. On the other hand, if the content of the vinyl aromatic hydrocarbon is large, the copolymer tends to show characteristics as thermoplastics. To utilize such excellent characteristics of the block copolymer, various production methods have been disclosed, for example, in JP-B-36-19286 and JP-B-48-4106. Further, the block copolymer has not only such excellent characteristics but also excellent compatibility with various vinyl aromatic hydrocarbon polymers and thus is useful for reinforcement, which is disclosed, for example, in JP-B-45-19388, JP-B-47-43618 and JP-B-51-27701.

However, such block copolymers and their compositions have had a drawback that they are inferior in spontaneous shrinkage resistance, although they are relatively transparent and have good impact resistance. Accordingly, when they are oriented to be used as heat shrinkable films, the films tend to undergo substantial shrinkage (spontaneous shrinkage) while they are left to stand still. Therefore, they have had problems that they can not be fixed as labels on various bottles or printings thereon tend to be dislocated. Therefore, it has been desired to develop a heat shrinkable film having the spontaneous shrinkage resistance improved, and a block copolymer or a block copolymer composition suitable for such a heat shrinkable film.

Under these circumstances, the present inventors have conducted an extensive study to obtain a heat shrinkable film having improved spontaneous shrinkage resistance and as a result, have found that a block copolymer having a specific weight ratio of the vinyl aromatic hydrocarbon to the conjugated diene in the block copolymer, a specific molecular weight of the block copolymer, a specific storage modulus, a specific block proportion of the vinyl aromatic hydrocarbon polymer and a specific proportion of chains consisting of repeating units of the vinyl aromatic hydrocarbon, or a block copolymer composition having a certain specific vinyl aromatic hydrocarbon polymer mixed thereto, satisfies the object, and that by using such a block copolymer or a block copolymer composition, it is possible to obtain the desired heat shrinkable film having improved spontaneous shrinkage resistance. The present invention has been accomplished on the basis of these discoveries.

That is, the present invention provides a block copolymer (hereinafter referred to as the block copolymer (I)) consisting essentially of a vinyl aromatic hydrocarbon and a conjugated diene and satisfying the following conditions (1) to (5) or such a block copolymer satisfying the following condition (6) in addition to the conditions (1) to (5), and a heat shrinkable film made of such a block copolymer.

(1) The weight ratio of vinyl aromatic hydrocarbon units to conjugated diene units is from 60:40 to 90:10.

(2) The number average molecular weight of the block copolymer is from 40,000 to 500,000.

(3) The ratio of E30/E10, where E30 is the storage modulus at a temperature of 30° C. and E10 is the storage modulus at a temperature of 10° C., is from 0.75 to 1.

(4) The block proportion of a vinyl aromatic hydrocarbon polymer contained in the block copolymer is from 70 to 100%, provided the block proportion=W1/W0×100, where W1 is the weight of block polymer chains of the vinyl aromatic hydrocarbon in the block copolymer, and W0 is the total weight of the vinyl aromatic hydrocarbon units in the block copolymer.

(5) Chains consisting of from 1 to 3 repeating units of the vinyl aromatic hydrocarbon contained in the block copolymer, are not more than 25%, based on the above W0.

(6) The structure of the block copolymer (I) is represented by one of the following formulae:

(a) $A-(B)_m$ (b) $A-C-(B)_m$ (c) $A-(C-B)_m$ (d) $A-(C-B)_m-(B)_n$ where A is a polymer chain of the vinyl aromatic hydrocarbon, B is a copolymer chain of the vinyl aromatic hydrocarbon and the conjugated diene, C is a polymer chain of the conjugated diene, m is an integer of at least 2, and n is an integer of at least 1.

Further, the present invention provides a block copolymer composition comprising the block copolymer (I) and the following polymer (II), and a heat shrinkable film made thereof:

(II) at least one polymer selected from the group consisting of (i) a block copolymer consisting essentially of a vinyl aromatic hydrocarbon and a conjugated diene, which is different from the block copolymer (I) as defined in claim 1 or 2, (ii) a vinyl aromatic hydrocarbon polymer, (iii) a copolymer consisting essentially of a vinyl aromatic hydrocarbon and a (meth)acrylate, and (iv) a rubber-modified styrene type polymer.

The block copolymer composition preferably comprises from 50 to 99.8 parts by weight of the block copolymer (I) and from 0.2 to 50 parts by weight of the polymer (II), provided that the total amount of the polymers (I) and (II) is 100 parts by weight, and when the polymer (II) is the rubber-modified styrene type polymer (iv), the amount of the polymer (iv) is not more than 20 parts by weight.

Now, the present invention will be described in detail with reference to the preferred embodiments.

The vinyl aromatic hydrocarbon to be used for the production of the block copolymer (I) of the present invention may, for example, be styrene, o-methylstyrene, p-methylstyrene, p-tert-butylstyrene, 2,4-dimethylstyrene, 2,5-dimethylstyrene, α-methylstyrene, vinyl naphthalene or vinyl anthracene. Particularly, styrene is commonly used.

The conjugated diene to be used for the production of the block copolymer (I) of the present invention may, for example, be 1,3-butadiene, 2-methyl-1,3-butadiene (isoprene), 2,3-dimethyl-1,3-butadiene, 1,3-pentadiene or 1,3-hexadiene. Particularly, 1,3-butadiene or isoprene is commonly used.

The weight ratio of the vinyl aromatic hydrocarbon to the conjugated diene is from 60:40 to 90:10, preferably from 70:30 to 85:15. If the vinyl aromatic hydrocarbon is less than 60%, the transparency and stiffness of the block copolymer tend to be low, and if it exceeds 90%, the impact resistance tends to be low, whereby the copolymer tends to be not practically useful.

The number average molecular weight of the block copolymer (I) is usually from 40,000 to 500,000, preferably from 80,000 to 300,000. If it is less than 40,000, no adequate stiffness or impact resistance of the block copolymer tends to be obtained, and if it exceeds 500,000, the processability tends to be low, such being undesirable.

In the present invention, the number average molecular weight of the block copolymer was determined by a conventional method using gel permeation chromatograph (hereinafter referred to simply as GPC).

The ratio of E'30/E'10, where E'30 is the storage modulus of the block copolymer at 30° C. and E'10 is the storage modulus of the block copolymer at a temperature of 10° C., which is the most remarkable characteristic of the block copolymer (I) of the present invention, is from 0.75 to 1, preferably from 0.8 to 1. If it is less than 0.75, the spontaneous shrinkage tends to be large, and the copolymer may not be practically useful as a heat shrinkable film. The block copolymer of the present invention undergoes no crosslinking reaction or the like at a temperature of 30° C., and the ratio of E'30/E'10 will accordingly be not higher than 1. The storage modulus is a value measured by a dynamic viscoelasticity measuring apparatus.

The block proportion of the vinyl aromatic hydrocarbon of the block copolymer (I) is usually from 70 to 100 wt %, preferably from 75 to 100 wt %. If the block proportion is less than 70 wt %, the transparency and stiffness tend to be low, such being undesirable.

The block proportion of the vinyl aromatic hydrocarbon is one obtained by the following formula.

$$\text{Block proportion (\%)} = W1/W0 \times 100$$

where W1 is the weight of block polymer chains of the vinyl aromatic hydrocarbon in the block copolymer, and W0 is the total weight of the vinyl aromatic hydrocarbon units in the block copolymer.

W1 in the above formula, was obtained by subjecting the block copolymer to ozonolysis by a method disclosed in a literature (Y. Tanaka, et al., "RUBBER CHEMISTRY AND TECHNOLOGY", 58, p.16 (1985)), measuring the obtained vinyl aromatic hydrocarbon polymer components by GPC, obtaining molecular weights corresponding to the respective peaks of the chromatogram from a calibration curve prepared by using standard polystyrene and styrene oligomer, and quantitatively analyzing those exceeding a number average molecular weight of 3,000 from the respective peak areas. As the detector for GPC measurement, an ultraviolet spectrophotometer having the wavelength set at 254 nm, was used.

The proportion of chains consisting of from 1 to 3 repeating units (hereinafter referred to as s1 to s3) of the vinyl aromatic hydrocarbon in the block copolymer (I), is desired to be not more than 25%, based on the total weight of the vinyl aromatic hydrocarbon units in the block copolymer. If the proportion of s1 to s3 chains exceeds 25%, spontaneous shrinkage tends to be substantial, such being undesirable. The proportion of s1 to s3 chains is obtained by the following formula.

$$\text{Proportion (\%) of S1 to s3 chains} = W2/W0 \times 100$$

where W2 is the weight of s1 to s3 in the block copolymer, and W0 is the total weight of the vinyl aromatic hydrocarbon units in the block copolymer.

W2 in the above formula was obtained by measuring the ozonolysis products obtained by the above mentioned method, by means of a column with an exclusion limit of 3,000 by GPC, identifying the obtained peaks by the method disclosed in a literature (Y. Tanaka, "Encyclopedia of Engineering Materials, (Part A)", 1, p.677 (1988)), and quantitatively measuring their peak areas.

The structure of the block copolymer (I) is preferably one represented by one of the following formulae:

(a) $A-(B)_m$ (b) $A-C-(B)_m$ (c) $A-(C-B)_m$ (d) $A-(C-B)_m-(B)_n$ where A is a polymer chain of the vinyl aromatic hydrocarbon, B is a copolymer chain of the vinyl aromatic hydrocarbon and the conjugated diene, C is a polymer chain of the conjugated diene, m is an integer of at least 2, and n is an integer of at least 1.

In the above formulae, A is a polymer chain of the vinyl aromatic hydrocarbon and thus represents a block polymer chain of the vinyl aromatic hydrocarbon, which can be introduced by polymerizing one or more types of the above mentioned vinyl aromatic hydrocarbons.

In the above formulae, B is a copolymer chain of the vinyl aromatic hydrocarbon and the conjugated diene. The plurality of B in the above formulae may be the same or different from one another in their molecular weights or the compositional distributions (the distributions of the vinyl aromatic hydrocarbon and the conjugated diene). The distributions may be random or graded i.e. the distribution densities of the vinyl aromatic hydrocarbon units and the conjugated diene units may be graded.

B can be introduced by copolymerizing the above vinyl aromatic hydrocarbon and the conjugated diene. At that time, the molecular weights and the compositional distributions can be controlled under definite polymerization conditions mainly by adjusting the amounts of the monomers and the manner of their addition.

In the above formulae, C is a polymer chain of the conjugated diene and thus represents a block polymer chain of the conjugated diene. It can be introduced by polymerizing one or more types of the above mentioned conjugated dienes. When a plurality of C are present in the formulae, the respective molecular weights may be the same or different.

Now, the method for producing the block copolymer (I) of the present invention will be described.

The block copolymer (I) can be produced by polymerizing monomers of the vinyl aromatic hydrocarbon and the conjugated diene in an organic solvent using a organic lithium compound as an initiator. The organic solvent may, for example, be an aliphatic hydrocarbon such as butane, pentane, hexane, isopentane, heptane, octane or isooctane, an alicyclic hydrocarbon such as cyclopentane, methylcyclopentane, cyclohexane, methylcyclohexane or ethylcyclohexane, or an aromatic hydrocarbon such as benzene, toluene, ethylbenzene or xylene.

The organic lithium compound is a compound having at least one lithium atom bonded in its molecule. For example, it is a monofunctional organic lithium compound such as n-propyl lithium, isopropyl lithium, n-butyl lithium, sec-butyl lithium or tert-butyl lithium, or a polyfunctional organic lithium compound such as hexamethylene dilithium, butadienyl dilithium or isoprenyl dilithium.

As the aromatic hydrocarbon and the conjugated diene to be used in the present invention, those mentioned above, can be used. For each of the vinyl aromatic hydrocarbon and the conjugated diene, one or more types may be selected for use for polymerization. In so-called living anionic polymerization using the above organic lithium compound as an initiator, the vinyl aromatic hydrocarbon and the conjugated diene subjected to the polymerization reaction will be converted to a polymer substantially in their entire amounts.

In the present invention, the molecular weight of the block copolymer (I) can be controlled by adjusting the amount of the initiator added to the total amount of the monomers.

In the present invention, the ratio (E'30/E'10) of the storage modulus at a temperature of 30° C. (E'30) to the storage modulus at a temperature of 10° C. (E'10) can be adjusted by controlling the weight ratio of the vinyl aromatic hydrocarbon to the conjugated diene in the block copolymer (I), the molecular weights or the compositional distributions of A, B and C in the above mentioned formulae, the block proportion of the copolymer, and the s1 to s3 chain proportions.

The block proportion and the s1 to s3 chain proportion in the block copolymer (I) can be controlled by adjusting the amount of a randomization agent used at the time of copolymerizing the vinyl aromatic hydrocarbon with the conjugated diene. As such a randomization agent, tetrahydrofuran (THF) is mainly used, but an ether, an amine, a thioether, a phosphoramide, an alkylbenzene sulfonate, or a potassium or sodium alkoxide may, for example, be also used. Useful ethers include, in addition to the above mentioned THF, dimethyl ether, diethyl ether, diphenyl ether, diethylene glycol dimethyl ether, and diethylene glycol diethyl ether, diethylene glycol dibutyl ether. The amine may, for example, be a tertiary amine such as trimethylamine, triethylamine or tetramethylethylenediamine, or a cyclic amine. Further, triphenylphosphine, hexamethylphosphoramide, a potassium or sodium alkylbenzene sulfonate, or a potassium or sodium butoxide, may also be used as a randomization agent.

The amount of the randomization agent is preferably from 0.001 to 10 parts by weight per 100 parts by weight of the total charged monomers. The timing of the addition may be prior to the initiation of the polymerization reaction or prior to the polymerization of the copolymer chain —B—. Further, it may be additionally added, as the case requires.

Further, the block proportion and the s1 to s3 chain proportion can be controlled also by continuously feeding the vinyl aromatic hydrocarbon and the conjugated diene mechanically to the polymerization reactor, or alternately adding the vinyl aromatic hydrocarbon and the conjugated diene to the polymerization reactor in divided small portions.

The block copolymer (I) thus obtained is inactivated by adding a polymerization terminating agent such as water, an alcohol or carbon dioxide in an amount sufficient to inactivate the active terminals. A method for recovering the copolymer from the obtained block copolymer solution may, for example, be (A) a method of precipitating it by a poor solvent such as methanol, (B) a method of precipitating it by evaporating the solvent by e.g. a heat roll (a drum drier method), (C) a method of removing the solvent by a vented extruder after concentrating the solution by a concentrator, or (D) a method of dispersing the solution in water, and blowing steam thereinto to heat and remove the solvent and to recover the copolymer (a steam stripping method).

Now, the polymer (II) to be used in the present invention, will be described.

The polymer (II) to be used in the present invention is at least one polymer selected from the group consisting of (i) a block copolymer consisting essentially of a vinyl aromatic hydrocarbon and a conjugated diene, which is different from the block copolymer (I), (ii) a vinyl aromatic hydrocarbon polymer, (iii) a copolymer consisting essentially of a vinyl aromatic hydrocarbon and a (meth)acrylate, and (iv) a rubber-modified styrene type polymer.

As the block copolymer (i), one prepared by polymerizing the vinyl aromatic hydrocarbon and the conjugated diene in a weight ratio of 60:40 to 90:10, is used. The number average molecular weight is not particularly limited, but is preferably from 40,000 to 500,000. Such a block copolymer can be prepared by polymerization in an organic solvent using an organic lithium compound as an initiator, in the same manner as for the above mentioned block copolymer (I), and the organic solvent, the initiator, the vinyl aromatic hydrocarbon, the conjugated diene and the randomization agent to be used, may be those which are described above.

The structure of this block copolymer (i) may take any form so long as the above requirements are satisfied. Preferred examples include structures having copolymer segments as shown by the following formulae:

(e) A—B (f) A—B—A (g) A—C—B (h) A—C—B—A (i) A—B—C—B (j) A—B—C—B—A (k) A—C—B—C—B—A (l) (A—B)$_m$—X (m) (A—C—B)$_m$—X (n) (A—C—B—A)$_m$—X (o) (A—C—B—C—B)$_m$—X and those having the following complete block structures:

(p) (A—C)$_n$ (q) (A—C)$_n$—A (r) (A—C)$_m$—X (s) (A—C—A)$_m$—X

In the above formulae, A, B, C, m and n are as defined above, and when a plurality of A are present in the formulae, they are molecular weights may be the same or different from one another. Further, X represents a residue of the above mentioned polyfunctional organic lithium compound to be used as an initiator, or a residue of a polyfunctional coupling agent. The polyfunctional coupling agent may, for example, be silicon tetrachloride or epoxydized soybean oil.

As the vinyl aromatic hydrocarbon polymer (ii), a homopolymer of a vinyl aromatic hydrocarbon as described for the production of the block copolymer (I), or a copolymer of two or more such vinyl aromatic hydrocarbons may be employed. Particularly, polystyrene may be mentioned as a common one.

The copolymer (iii) consisting essentially of a vinyl aromatic hydrocarbon and a (meth)acrylate is one which maintains transparency even when mixed with the block copolymer (I). It may be obtained by polymerizing the vinyl aromatic hydrocarbon as described for the production of the block copolymer (I), with a (meth)acrylate. The (meth) acrylate may, for example, be methyl acrylate, ethyl acrylate, butyl acrylate, isobutyl acrylate, hexyl acrylate, (2-ethyl)hexyl acrylate, methyl methacrylate, ethyl methacrylate, butyl methacrylate or (2-hydroxy)ethyl methacrylate.

Such a copolymer (iii) can be obtained by polymerizing a monomer mixture comprising a vinyl aromatic hydrocarbon and a (meth)acrylate in a weight ratio of from 5:95 to 99:1, preferably from 40:60 to 99:1, more preferably from 70:30 to 99:1.

The rubber-modified styrene type polymer (iv) can be obtained by polymerizing a vinyl aromatic hydrocarbon or a monomer copolymerizable therewith, in the presence of various elastomers. As the vinyl aromatic hydrocarbon, those described above for the production of the block copolymer (I), may be employed. As the monomer copolymerizable therewith, (meth)acrylic acid or a (meth)acrylate may, for example, be employed. As the elastomer, butadiene rubber, styrene-butadiene rubber, styrene-butadiene block copolymer elastomer, chloroprene rubber or natural rubber may, for example, be employed. A particularly preferred rubber-modified styrene type polymer may be high impact polystyrene (HIPS).

The block copolymer composition of the present invention comprises the block copolymer (I) and the polymer (II). It is preferably a block copolymer composition comprising form 50 to 99.8 parts by weight of the block copolymer (I) and from 0.2 to 50 parts by weight of the polymer (II), provided that the total amount of the polymers (I) and (II) is 100 parts by weight. The polymer (i) is used for improvement of stiffness and impact resistance, and it is used preferably in an amount of from 0.2 to 50 parts by weight, more preferably from 0.2 to 40 parts by weight, in the total amount. If it is less than 0.2 part by weight, no adequate effect of its addition tends to be observed, and if it exceeds 50 parts by weight, spontaneous shrinkage of a heat shrinkable film obtainable from such a block copolymer composition tends to be substantial, such being undesirable. The polymer (ii) or (iii) is used for improvement of stiffness, and it is preferably used in an amount of from 0.2 to 50 parts by weight, more preferably from 0.2 to 30 parts by weight, in the total amount. If it is less than 0.2 part by weight, no adequate effect of its addition tends to be observed, and if it exceeds 50 parts by weight, stiffness tends to be high, whereby there will be a problem that orientation tends to be difficult. The polymer (iv) is used for improvement of stiffness and impact resistance, and it is preferably used in an amount of from 0.2 to 20 parts by weight, more preferably from 0.2 to 10 parts by weight, in the total amount. If it is less than 0.2 part by weight, no adequate effect of its addition tends to be observed, and if it exceeds 20 parts by weight, transparency tends to deteriorate to a practically useless level. When it is used for improvement of the slipping property of the film, it may be incorporated in an amount of from 0.2 to 5 parts by weight.

In order to effectively use the block copolymer composition of the present invention in various fields, various additives may be incorporated as the case requires. The additives include, for example, various stabilizers, lubricants, processing aids, antiblocking agents, antistatic agents, antifog agents, light stabilizers softening agents, plasticizers, and pigments. Such additives may be added to the block copolymer solution or may be blended with a recovered copolymer, followed by melt mixing.

The stabilizers include, for example, phenol type antioxidants such as 2-tert-butyl-6-(3-tert-butyl-2-hydroxy-5-methylbenzyl)-4-methylphenyl acrylate, 2-[1-(2-hydroxy-3,5-di-tert-pentylphenyl)ethyl]-4,6-di-tert-pentylphenyl acrylate, octadecyl-3-(3,5-di-tert-butyl-4-hydroxyphenyl) propionate, and 2,6-di-tert-butyl-4-methylphenol, and phosphorus-type antioxidants such as trisnonylphenyl phosphite. As the antiblocking agent, the antistatic agent or the lubricant, a fatty acid amide, ethylenebisstearamide, sorbitane monostearate, a saturated fatty acid ester of an aliphatic alcohol, or a pentaerythritol fatty acid ester, may, for example, be mentioned. Such additives are used preferably within a range of at most 5 wt % relative to the block copolymer.

The composition of the present invention can be obtained by mixing the block copolymer (I) and the polymer (II). The mixing method may be any conventional method. For example, it may be dry-blended by e.g. a Henshel mixer, a ribbon blender, a supermixer or a V-blender. Further, it may be melted and pelletized by an extruder. Melt mixing is particularly preferred. Further, it is possible to employ a method in which the polymer solutions are mixed to each other, whereupon the solvent is removed.

The heat shrinkable film of the present invention can be obtained by uniaxially, biaxially or multi-axially orienting a sheet or film obtained by extruding the above described block copolymer composition by a conventional method such as a T-die technique or a tubular technique. As an example of uniaxial orientation, a method of orienting an extruded sheet by a center in a direction perpendicular to the direction for extrusion, or a method of orienting an extruded tubular film in a circumferential direction, may be mentioned. As an example of biaxial orientation, a method of orienting an extruded sheet by a roll in the direction for extrusion and then by e.g. a center in a direction perpendicular to the direction for extrusion, or a method of orienting an extruded tubular film in the direction for extrusion and in the circumferential direction simultaneously or sequentially, may be mentioned.

In the present invention, the temperature for orientation is preferably from 60 to 120° C. If it is lower than 60° C., the sheet or film is likely to break during orientation, and if it exceeds 120° C., a good shrinkable property tends to be hardly obtainable. The orientation ratio is not particularly limited, but is preferably from 1.5 to 8 times. If it is less than 1.5 times, the heat shrinkability tends to be inadequate, and if it exceeds 8 times, orientation tends to be difficult. When such a film is to be used as a heat shrinkable label or wrapping material, the heat shrinkability is required to be at least 20% at 80° C. If the heat shrinkability is less than 20%, a high temperature will be required for shrinkage, whereby an article to be wrapped is likely to be adversely affected. The thickness of the film is preferably from 10 to 300 $\mu$m.

The heat shrinkable film of the present invention is useful particularly for a heat shrinkable label or a heat shrinkable cap seal, but it is also suitable for use as a wrapping film or the like.

Now, the present invention will be described in detail with reference to Examples. However, it should be understood that the present invention is by no means restricted by the following Examples.

The structural characteristics and physical properties shown in Tables 1 to 7, were Measured by the following methods.

(1) Number average molecular weight: Measured by a GPC method under the following conditions:

(A) Measuring apparatus: "SHODEX SYSTEM-21", manufactured by Showa Denko K. K.

(B) Column: "PL gel MIXED-B", manufactured by POLYMER LABORATORY INC., three columns (C) Solvent; Tetrahydrofuran (D) Quantitative determination: A calibration curve was prepared by using standard polystyrene.

(2) Storage modulus: Measured by using a viscoelasticity spectrometer "DMS210", manufactured by Seiko Denshi K. K., at a frequency of 1 Hz at temperatures of 30° C. and 10° C.

(3) Haze: Measured in accordance with ASTM D1003 (thickness of the test specimen: 2 mm). The lower the haze, the better the transparency.

(4) Tensile modulus: Measured in accordance with JIS K6871. A test specimen of No. 1 type was used, and a test speed of F was employed. The higher the tensile modulus, the higher the stiffness.

(5) Izod impact strength: Measured in accordance with JIS K6871. A test specimen of No. 2A was used. The higher the Izod impact strength, the higher the impact resistance.

(6) Heat shrinkability: An oriented film was immersed in a warm water of 80° C. for 30 seconds, whereupon the heat shrinkability was calculated by the following formula:

Heat shrinkability (%)=(L1–L2)/L1×100 where L1 is the length (in the direction for orientation) before shrinkage, and L2 is the length (in the direction for orientation) after shrinkage.

(7) Spontaneous shrinkability: An oriented film is left ato stand at 30° C. for 30 days, whereupon the spontaneous shrinkability was calculated by the following formula:

Spontaneous shrinkability (%)=(L3–L4)/L3×100 where L3 is the length (in the direction for orientation) before being left, and L4 is the length (in the direction for orientation) after being left.

Method for preparing block copolymers (I) P1 to P12 of Examples or Comparative Examples Styrene and butadiene were polymerized in cyclohexane using n-butyl lithium as a polymerization initiator and tetrahydrofuran as a randomization agent, to obtain a block copolymer having structural characteristics as identified in Table 1, 2, 3 or 4. The number average molecular weight (Mn) was adjusted by the amount of n-butyl lithium, and the block proportion and the S1 to s3 chain proportion were adjusted by the amount of tetrahydrofuran. For example, block copolymer P1 was prepared as follows. Into a 100 l polymerization reactor, 65 l of cyclohexane, 7.8 g of tetrahydrofuran and 3.5 kg of styrene were charged, and 114 ml of n-butyl lithium (a 10% cyclohexane solution) was added thereto at a temperature of 30° C. with stirring. Then, the temperature was raised, and polymerization was carried out at a temperature of 45° C. for one hour. Then, 7.38 kg of styrene and 1.87 kg of butadiene were added, and polymerization was carried out at 70° C. for one hour. Then, 7.38 kg of styrene and 1.87 kg of butadiene were further added, and polymerization was carried out at 70° C. for one hour. Thereafter, an excess methanol was added to the polymerization solution to terminate the polymerization, and the solvent was removed, followed by drying to obtain the desired block copolymer P1.

Further, block copolymer P4 was prepared as follows. Into a 100 l polymerization reactor, 65 l of cyclohexane, 7.8 g of tetrahydrofuran and 3.08 kg of styrene were charged, and 118 ml of n-butyl lithium (a 10% cyclohexane solution) was added thereto at a temperature of 30° C. with stirring. Then, the temperature was raised, and polymerization was carried out at a temperature of 45° C. for one hour. Then, 310 g of butadiene was added, and polymerization was carried out at 60° C. for one hour. Then, 7.92 kg of styrene and 1.23 kg of butadiene were added, and polymerization was carried out at 70° C. for one hour. Then, 310 g of butadiene was added, and polymerization was carried out at 70° C. for one hour. Then, 7.92 kg of styrene and 1.23 kg of butadiene were further added, and polymerization was carried out at 70° C. for one hour. Thereafter, the same operation as described above was carried out to obtain the desired block copolymer P4. The structural characteristics such as the number average molecular weight and the storage modulus ratio of the obtained copolymer are shown in Table 1, 2, 3 or 4.

EXAMPLES 1 TO 5 and COMPARATIVE EXAMPLES 1 TO 7

With respect to each block copolymer, the physical properties of an injection molded product and the heat shrinkability and spontaneous shrinkability of a film, are shown in Table 1, 2, 3 or 4. Whereas, the film was prepared by firstly extrusion molding a sheet having a thickness of 0.3 mm at a temperature of 210° C. and then transversely uniaxially orienting the sheet five times at 90° C. by means of a biaxial orientation apparatus manufactured by Kabushiki Kaisha Toyo Seiki Seisakusho (thickness: about 60 $\mu$m). This film was used as a test specimen for the tests of the above items (6) (heat shrinkability) to (7) (spontaneous shrinkability). From the physical properties shown in Tables 1 to 4, it is evident that the block copolymers of the present invention are excellent in transparency, stiffness, impact resistance and spontaneous shrinkage resistance.

TABLE 1

| | | Examples | | |
|---|---|---|---|---|
| | | 1 | 2 | 3 |
| Type of block copolymer | | P1 | P2 | P3 |
| Structural characteristics | Weight ratio of styrene to butadiene (charged amounts) | 83/17 | 83/17 | 83/17 |
| | General formula | A-B-B | A-B-B | A-B-B |
| | Number average molecular weight (Mn) | 184,000 | 204,000 | 188,000 |
| | E'30/E'10 | 0.84 | 0.90 | 0.94 |
| | Styrene block proportion (%) | 81 | 80 | 82 |
| | s1 to s3 chain proportion (%) | 16 | 16 | 13 |
| Physical properties | Haze (%) | 1.5 | 1.5 | 1.6 |
| | Tensile modulus (kg/cm$^2$) | 12,300 | 12,600 | 13,100 |
| | Izod impact strength | 2.2 | 2.2 | 2.3 |

TABLE 1-continued

| | Examples | | |
| --- | --- | --- | --- |
| | 1 | 2 | 3 |
| Type of block copolymer | P1 | P2 | P3 |
| (kg · cm/cm) | | | |
| Heat shrinkability (%) | 49 | 41 | 43 |
| Spontaneous shrinkability (%) | 2.1 | 2.0 | 1.4 |

TABLE 2

| | | Examples | |
| --- | --- | --- | --- |
| | | 4 | 5 |
| Type of block copolymer | | P4 | P5 |
| Structural characteristics | Weight ratio of styrene to butadiene (charged amounts) | 86/14 | 75/25 |
| | General formula | A-C-B-C-B | A-C-B-C-B-B |
| | Number average molecular weight (Mn) | 178,000 | 212,000 |
| | $E'30/E'10$ | 0.92 | 0.81 |
| | Styrene block proportion (%) | 83 | 78 |
| | s1 to s3 chain proportion (%) | 12 | 18 |
| Physical properties | Haze (%) | 1.3 | 2.0 |
| | Tensile modulus (kg/cm$^2$) | 14,600 | 11,300 |
| | Izod impact strength (kg · cm/cm) | 2.2 | 2.9 |
| | Heat shrinkability (%) | 45 | 42 |
| | Spontaneous shrinkability (%) | 1.6 | 2.2 |

TABLE 3

| | | Comparative Examples | | | |
| --- | --- | --- | --- | --- | --- |
| | | 1 | 2 | 3 | 4 |
| Type of block copolymer | | P6 | P7 | P8 | P9 |
| Structural characteristics | Weight ratio of styrene to butadiene (charged amounts) | 56/46 | 95/5 | 79/21 | 81/19 |
| | General formula | A-B-B | A-B-B | A-B-B | A-B-B |
| | Number average molecular weight (Mn) | 162,000 | 185,000 | 30,000 | 192,000 |
| | $E'30/E'10$ | 0.81 | 0.97 | 0.87 | 0.73 |
| | Styrene block proportion (%) | 70 | 93 | 83 | 72 |
| | s1 to s3 chain proportion (%) | 19 | 5 | 13 | 21 |
| Physical properties | Haze (%) | 4.6 | 0.8 | 2.5 | 2.0 |
| | Tensile modulus (kg/cm$^2$) | 6,900 | 19,500 | 9,700 | 12,200 |
| | Izod impact strength (kg · cm/cm) | 4.3 | 1.1 | 1.4 | 2.2 |

TABLE 3-continued

| | Comparative Examples | | | |
| --- | --- | --- | --- | --- |
| | 1 | 2 | 3 | 4 |
| Type of block copolymer | P6 | P7 | P8 | P9 |
| Heat shrinkability (%) | 41 | Too brittleto form a film | 35 | 44 |
| Spontaneous shrinkability (%) | 3.6 | | 0.9 | 3.2 |

TABLE 4

| | | Comparative Examples | | |
| --- | --- | --- | --- | --- |
| | | 5 | 6 | 7 |
| Type of block copolymer | | P10 | P11 | P12 |
| Structural characteristics | Weight ratio of styrene to butadiene (charged amounts) | 73/27 | 82/18 | 80/20 |
| | General formula | A-B-B | A-B-B | A-B-B |
| | Number average molecular weight (Mn) | 80,000 | 186,000 | 520,000 |
| | $E'30/E'10$ | 0.76 | 0.76 | 0.83 |
| | Styrene block proportion (%) | 65 | 71 | 79 |
| | s1 to s3 chain proportion (%) | 23 | 26 | 19 |
| Physical properties | Haze (%) | 4.2 | 2.1 | 2.9 |
| | Tensile modulus (kg/cm$^2$) | 9,800 | 11,800 | 13,600 |
| | Izod impact strength (kg · cm/cm) | 3.4 | 2.2 | 2.7 |
| | Heat shrinkability (%) | 41 | 43 | Impossible to form a proper sheet |
| | Spontaneous shrinkability (%) | 2.8 | 3.4 | |

Now, Examples for the block copolymer composition of the present invention will be described. The measurements of the physical properties of each block copolymer composition, were carried out in the same manner as for the above described block copolymer. The film was prepared by firstly extrusion molding a sheet in the same manner as above and then transversely uniaxially orienting the sheet five times at 95° C. (thickness: about 60 μm).

EXAMPLES 6 TO 11 and COMPARATIVE EXAMPLES 8 TO 17

Using the polymer as identified in Table 5 as the polymer (II), a block copolymer composition was prepared in accordance with the blend formulation as identified in Table 6 or 7. With respect to each block copolymer composition, the physical properties of an injection molded product and the heat shrinkability and spontaneous shrinkability of a film, are shown in Table 6 or 7. From the physical properties shown in Tables 6 and 7, it is evident that the block copolymer compositions of the present invention are excellent in transparency, stiffness, impact resistance and spontaneous shrinkage resistance.

TABLE 5

| Polymer No. | Polymer structure | Number average molecular weight (Mn) | Polymer composition |
|---|---|---|---|
| a | A-B | 190,000 | Butadiene: 20 wt % |
| b | Polystyrene | 110,000 | Butadiene: 0 wt % |
| c | Styrene-methyl methacrylate copolymer | 105,000 | Methyl methacrylate: 22 wt % |
| d | Styrene-n-butyl acrylate copolymer | 142,000 | n-Butyl acrylate: 4 wt % |
| e | HIPS | 88,000 | Butadiene: 7 wt % |

TABLE 6

| | | Examples | | | | | |
|---|---|---|---|---|---|---|---|
| | | 6 | 7 | 8 | 9 | 10 | 11 |
| Blend | Type and amount (parts by weight) of block copolymer | P1 80 | P1 85 | P1 99 | P1 90 | P1 60 | P4 80 |
| | Type and amount (parts by weight) of blend polymer | a 20 | b 15 | e 1 | c 9<br>e 1 | a 33<br>b 5<br>e 2 | d 20 |
| Physical properties | Haze (%) | 1.6 | 1.7 | 3.1 | 3.2 | 4.6 | 1.5 |
| | Tensile modulus (kg/cm$^2$) | 12,200 | 14,500 | 12,600 | 14,000 | 13,200 | 16,800 |
| | Izod impact strength (kg · cm/cm) | 2.3 | 2.0 | 2.4 | 2.1 | 2.4 | 2.1 |
| | Heat shrinkability (%) | 45 | 41 | 43 | 42 | 43 | 42 |
| | Spontaneous shrinkability (%) | 2.3 | 1.6 | 2.2 | 1.7 | 1.8 | 1.1 |

TABLE 7

| | | Comparative Examples | | | | | | | | |
|---|---|---|---|---|---|---|---|---|---|---|
| | | 8 | | 9 | | 10 | | 11 | | 12 |
| Blend | Type and amount (parts by weight) of block copolymer | P6 | 85 | P7 | 85 | P8 | 85 | P9 | 85 | P10 85 |
| | Type and amount (parts by weight) of blend polymer | b | 15 | b | 15 | b | 15 | b | 15 | b 15 |
| Physical properties | Haze (%) | 4.7 | | 0.9 | | 2.7 | | 2.2 | | 4.4 |
| | Tensile modulus (kg/cm$^2$) | 9,500 | | 21,000 | | 11,000 | | 14,400 | | 12,300 |
| | Izod impact strength (kg · cm/cm) | 3.5 | | 1.0 | | 1.1 | | 1.9 | | 3.0 |
| | Heat shrinkability (%) | 41 | | Too brittle to form a film | | 33 | | 42 | | 40 |
| | Spontaneous shrinkability (%) | 3.0 | | | | 0.7 | | 2.8 | | 2.7 |

| | | Comparative Examples | | | | | | | | |
|---|---|---|---|---|---|---|---|---|---|---|
| | | 13 | | 14 | | 15 | | 16 | | 17 |
| Blend | Type and amount (parts by weight) of block copolymer | P11 | 85 | P12 | 85 | P1 | 4 | P1 | 25 | P1 60 |
| | Type and amount (parts by weight) of blend polymer | b | 15 | b | 15 | a | 96 | c | 75 | d 10<br>e 30 |
| Physical properties | Haze (%) | 2.2 | | 3.2 | | 1.7 | | 1.9 | | 90 |
| | Tensile modulus (kg/cm$^2$) | 14,000 | | 15,600 | | 11,600 | | 24,200 | | 15,700 |
| | Izod impact strength (kg · cm/cm) | 2,0 | | 2.4 | | 2.4 | | 1.2 | | 4.2 |
| | Heat shrinkability (%) | 40 | | Impossible to form a proper sheet | | 47 | | Too brittle to form a film | | 38 |
| | Spontaneous shrinkability (%) | 2.9 | | | | 3.0 | | | | 1.2 |

A heat shrinkable film obtained by orienting the block copolymer of the present invention or a composition of the block copolymer, is excellent in transparency, stiffness, impact resistance and spontaneous shrinkage resistance and thus is suitable for covering an article which is likely to scatter upon breakage, such as a glass bottle, or as a heat shrinkable film for labels provided with various printings. Further, the block copolymer and the block copolymer composition of the present invention may be molded by injection molding or blow molding to obtain various molded products, or they may be formed into films or sheets by e.g. extrusion molding or inflation molding and may be used as they are, or may further be subjected to secondary processing such as vacuum forming for various applications.

What is claimed is:

1. A block copolymer (I) consisting essentially of a vinyl aromatic hydrocarbon and a conjugated diene and satisfying the following conditions (1) to (5):

(1) the weight ratio of vinyl aromatic hydrocarbon units to conjugated diene units is from 60:40 to 90:10, (2) the number average molecular weight of the block copolymer is from 40,000 to 500,000, (3) the ratio of E'30/E'10, where E'30 is the storage modulus at a temperature of 30° C. and E'10 is the storage modulus at a temperature of 10° C., is from 0.75 to 1, (4) the homopolymer block proportion of a vinyl aromatic hydrocarbon polymer contained in the block copolymer is from 70 to 100%, provided the block proportion= W1/W0×100, where W1 is the weight of homopolymer block polymer chains of the vinyl aromatic hydrocarbon in the block copolymer, and W0 is the total weight of the vinyl aromatic hydrocarbon units in the block copolymer, and (5) chains consisting of from 1 to 3 repeating units of the vinyl aromatic hydrocarbon contained in the block copolymer, are not more than 25%, based on the above W0.

2. The block copolymer according to claim 1, wherein the structure of the block copolymer (I) is represented by one of the following formulae:

(a) A—(B)$_m$ (b) A—C—(B)$_m$ (c) A—(C—B)$_m$ (d) A—(C—B)$_m$—(B)$_n$ where A is a polymer chain of the vinyl aromatic hydrocarbon, B is a copolymer chain of the vinyl aromatic hydrocarbon and the conjugated diene, C is a polymer chain of the conjugated diene, m is an integer of at least 2, and n is an integer of at least 1.

3. A heat shrinkable film made of the block copolymer as defined in claim 1.

4. A block copolymer composition comprising the block copolymer (I) as defined in claim 1 and the following polymer (II):

(II) at least one polymer selected from the group consisting of (i) a block copolymer consisting essentially of a vinyl aromatic hydrocarbon and a conjugated diene, which is different from the block copolymer (I) as defined in claim 1, (ii) a vinyl aromatic hydrocarbon polymer, (iii) a copolymer consisting essentially of a vinyl aromatic hydrocarbon and a (meth)acrylate, and (iv) a rubber-modified styrene type polymer.

5. The block copolymer composition according to claim 4, which comprises from 50 to 99.8 parts by weight of the block copolymer (I) and from 0.2 to 50 parts by weight of the polymer (II), provided that the total amount of the polymers (I) and (II) is 100 parts by weight, and when the polymer (II) is the rubber-modified styrene type polymer (iv), the amount of the polymer (iv) is not more than 20 parts by weight.

6. The block copolymer composition according to claim 4, wherein the structure of the block copolymer (I) is represented by one of the following formulae:

(a) $A\text{---}(B)_m$ (b) $A\text{---}C\text{---}(B)_m$ (c) $A\text{---}(C\text{---}B)_m$ (d) $A\text{---}(C\text{---}B)_m\text{---}(B)_n$ where A is a polymer chain of the vinyl aromatic hydrocarbon, B is a copolymer chain of the vinyl aromatic hydrocarbon and the conjugated diene, C is a polymer chain of the conjugated diene, m is an integer of at least 2, and n is an integer of at least 1.

7. A heat shrinkable film made of a block copolymer composition as defined in claim 4.

* * * * *